US012327918B2

(12) United States Patent
Xu et al.

(10) Patent No.: US 12,327,918 B2
(45) Date of Patent: Jun. 10, 2025

(54) ANTENNA GAIN APPARATUS AND COMMUNICATION DEVICE

(71) Applicant: Ruijie Networks Co., Ltd., Fuzhou (CN)

(72) Inventors: Huishan Xu, Fujian (CN); Zhaoxian Zhou, Fujian (CN); Yang Su, Fujian (CN); Fan Yang, Fujian (CN)

(73) Assignee: Ruijie Networks Co., Ltd., Fuzhou (CN)

(*) Notice: Subject to any disclaimer, the term of this patent is extended or adjusted under 35 U.S.C. 154(b) by 19 days.

(21) Appl. No.: 18/733,042

(22) Filed: Jun. 4, 2024

(65) Prior Publication Data

US 2024/0322455 A1 Sep. 26, 2024

Related U.S. Application Data

(63) Continuation of application No. PCT/CN2023/134834, filed on Nov. 28, 2023.

(30) Foreign Application Priority Data

Nov. 28, 2022 (CN) ........................ 202211505172.5

(51) Int. Cl.
*H01Q 21/26* (2006.01)
*H01Q 9/04* (2006.01)

(52) U.S. Cl.
CPC ............... *H01Q 21/26* (2013.01); *H01Q 9/04* (2013.01); *H01Q 9/0485* (2013.01)

(58) Field of Classification Search
CPC ......... H01Q 21/26; H01Q 9/0485; H01Q 9/04
See application file for complete search history.

(56) References Cited

U.S. PATENT DOCUMENTS

| | | | | |
|---|---|---|---|---|
| 4,835,538 A * | 5/1989 | McKenna | H01Q 9/0414 343/700 MS |
| 5,874,924 A * | 2/1999 | Csongor | H01Q 1/288 343/789 |
| 11,476,585 B1 * | 10/2022 | Abdelmonem | H01Q 21/26 |
| 2005/0179610 A1 * | 8/2005 | Le | H01Q 21/28 343/797 |
| 2021/0143548 A1 * | 5/2021 | Chivukula | H01Q 1/48 |
| 2021/0234285 A1 * | 7/2021 | Sobina | H01Q 21/26 |
| 2022/0037802 A1 | 2/2022 | Lahav et al. | |
| 2022/0247072 A1 * | 8/2022 | Shamblin | H01Q 3/2611 |

FOREIGN PATENT DOCUMENTS

| | | |
|---|---|---|
| CN | 109004337 A | 12/2018 |
| CN | 109980360 A | 7/2019 |
| CN | 212908065 U | 4/2021 |
| CN | 114639971 A | 6/2022 |

* cited by examiner

*Primary Examiner* — Hai V Tran
(74) *Attorney, Agent, or Firm* — ArentFox Schiff LLP; Michael Fainberg

(57) ABSTRACT

This application discloses an antenna gain apparatus and a communication device. The antenna gain apparatus includes a first guiding portion and a second guiding portion. The first guiding portion is configured to be disposed at one side of an antenna radiating element in a first direction; and the second guiding portion is disposed on the first guiding portion, where the second guiding portion is located at one side of the first guiding portion in the first direction, and a shape of the second guiding portion matches a shape of the antenna radiating element.

20 Claims, 9 Drawing Sheets

ANTENNA GAIN APPARATUS AND COMMUNICATION DEVICE

CROSS-REFERENCE TO RELATED APPLICATIONS

This application is a continuation application of International Patent Application No. PCT/CN2023/134834 filed on Nov. 28, 2023, which claims priority to Chinese patent application No. 202211505172.5, filed with the China National Intellectual Property Administration on Nov. 28, 2022, and entitled "ANTENNA GAIN APPARATUS AND COMMUNICATION DEVICE", both of which are incorporated herein by reference in their entireties.

TECHNICAL FIELD

This application relates to the field of antenna technologies, and in particular, to an antenna gain apparatus and a communication device.

BACKGROUND

With continuous development of wireless communication products, electromagnetic wave signals in space are becoming increasingly complex, which imposes higher requirements on the signal coverage strength and quality of wireless devices. As a signal transceiver module of the wireless device, an antenna is an important part for determining product performance. Improving antenna gain and increasing a product coverage distance under a limited volume is a valuable research direction in antenna development. A higher antenna gain and a greater coverage distance can reduce a number of antenna products in a coverage area to achieve the purposes of energy saving and efficiency improvement.

SUMMARY

Exemplary embodiments of this application provide an antenna gain apparatus and a communication device, so as to resolve the problem of high loss of high-gain antennas.

According to one aspect, an embodiment of this application provides an antenna gain apparatus, including a first guiding portion and a second guiding portion. The first guiding portion is configured to be disposed at one side of an antenna radiating element in a first direction; and the second guiding portion is disposed on the first guiding portion, where the second guiding portion is located at one side of the first guiding portion in the first direction, and a shape of the second guiding portion matches a shape of the antenna radiating element.

According to one aspect of this embodiment of this application, the first guiding portion may be made of a mono-dielectric material with a fixed dielectric constant. For example, the first guiding portion may be made of polytetrafluoroethylene. The first guiding portion may be a columnar structure, for example, the first guiding portion may be in a shape of cylinder, cube, or the like.

According to one aspect of this embodiment of this application, the second guiding portion may be of a metal material. For example, the second guiding portion may be made of copper. The second guiding portion may be in a sheet-like structure.

According to one aspect of this embodiment of this application, a distance between the first guiding portion and the antenna radiating element is L, and L=0.2λ to 0.4λ; where λ is a wavelength corresponding to a center frequency of an operating frequency band of an antenna.

According to one aspect of this embodiment of this application, a height of the first guiding portion in the first direction is D1, and D1=0.23λ to 0.28λ; where λ is a wavelength corresponding to a center frequency of an operating frequency band of an antenna.

According to one aspect of this embodiment of this application, a cross-sectional size of the first guiding portion is greater than a size of the antenna radiating element in a second direction, and the second direction is perpendicular to the first direction.

According to one aspect of this embodiment of this application, the first guiding portion has a through hole, and the through hole extends along the first direction.

According to one aspect of this embodiment of this application, the through hole is arranged in an area of the first guiding portion that is not covered by the second guiding portion.

According to one aspect of this embodiment of this application, the first guiding portions are plural, and the plurality of first guiding portions are sequentially arranged away from the antenna radiating element in the first direction.

According to one aspect of this embodiment of this application, a second guiding portion is disposed on each of the first guiding portions, respectively.

According to one aspect of this embodiment of this application, a distance between each adjacent first guiding portions is equal to one another.

According to one aspect of this embodiment of this application, the distance between the adjacent first guiding portions is L1 and a distance between a first guiding portion closest to the antenna radiating element and the antenna radiating element is L, where L1=L.

According to one aspect of this embodiment of this application, the first guiding portion is spaced apart from the antenna radiating element.

According to one aspect of this embodiment of this application, the first guiding portion is fastened on the antenna radiating element through a support; or the first guiding portion is fastened, through a support or directly, on a cover of an antenna in which the antenna radiating element is located.

According to one aspect of this embodiment of this application, the first direction is perpendicular to a radiation plane of the antenna radiating element.

According to one aspect of this embodiment of this application, the second guiding portion is located at one side of the first guiding portion away from the antenna radiating element in the first direction.

According to one aspect of this embodiment of this application, a radial size of the first guiding portion in the second direction is D2, and D2=0.25λ to 0.3λ; where λ is a wavelength corresponding to a center frequency of an operating frequency band of an antenna.

According to one aspect of this embodiment of this application, when the first guiding portion is a cylinder, D2 is a diameter of the cylinder; and when the first guiding portion is a cube, D2 is a length of the cross-sectional diagonal line.

According to another aspect, an embodiment of this application provides a communication device, including an antenna radiating element and the antenna gain apparatus described above, where the antenna gain apparatus is disposed at one side of the antenna radiating element in a first direction.

The antenna gain apparatus provided in the embodiments of this application enhances the gain of the antenna radiating element by disposing the first guiding portion and the second guiding portion, which improves the directivity and increases the antenna coverage distance without changing the feed network of the antenna nor increasing the link loss or the size and weight of the antenna itself, featuring lower costs, simpler structure, easier installation, and convenient combination with antenna products.

Other features and advantages of this application will be set forth later in the specification, and in part will be readily apparent from the specification, or may be understood by implementing this application. Objectives and other advantages of this application may be achieved and obtained by using a structure particularly stated in the written specification, claims, and accompanying drawings.

BRIEF DESCRIPTION OF DRAWINGS

To describe the technical solutions in the embodiments of this application or the prior art more clearly, the following briefly describes the accompanying drawings for describing the embodiments or the prior art. Clearly, the accompanying drawings in the following descriptions show merely some embodiments of the present invention, and persons of ordinary skill in the art may still derive drawings of other embodiments from these accompanying drawings without creative efforts.

The accompanying drawings described herein are intended for better understanding of this application, and constitute a part of this application. Exemplary embodiments and descriptions thereof in this application are intended to interpret this application and do not constitute any improper limitation on this application. In the accompanying drawings.

REFERENCE NUMERALS

Figure 1:
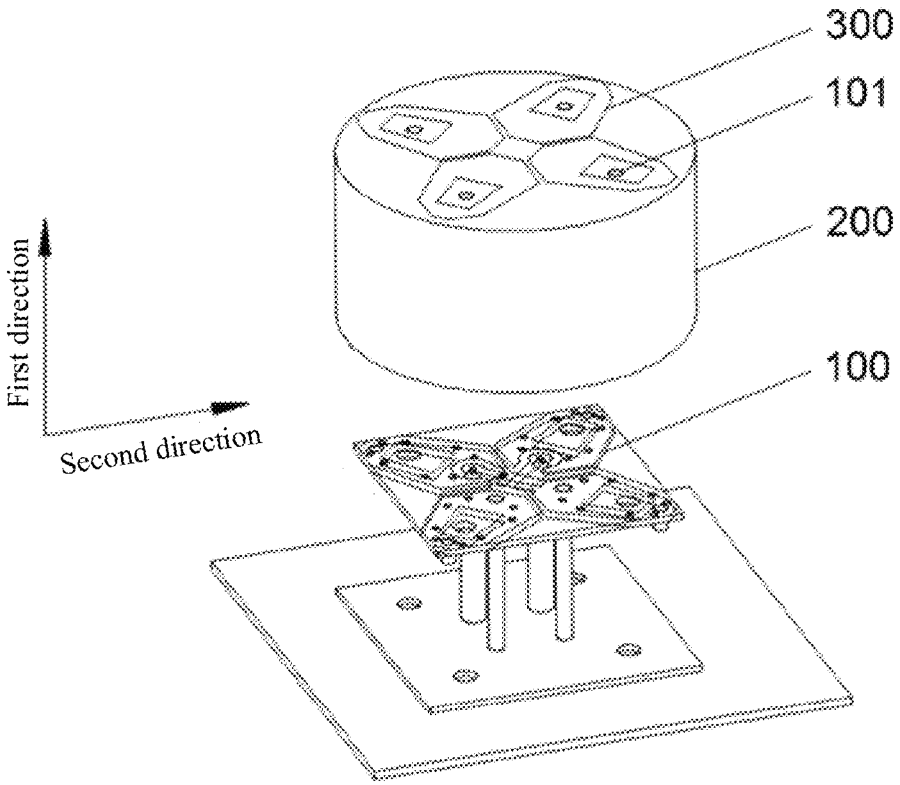
FIG. 1 is a schematic diagram of a three-dimensional structure of an antenna gain apparatus according to an embodiment of this application.

100: antenna radiating element, 200: first guiding portion, 300: second guiding portion, 101: through hole.

DESCRIPTION OF EMBODIMENTS

To make the objectives, technical solutions, and advantages of the embodiments of this application clearer, the following clearly and completely describes the technical solutions of this application with reference to the accompanying drawings in the embodiments of this application. Apparently, the described embodiments are some but not all of the embodiments of this application. All other embodiments obtained by a person of ordinary skill in the art based on the embodiments described in this application document without creative efforts shall fall within the protection scope of the technical solutions of this application.

In the specification, claims, and accompanying drawings of this application, the terms "first" and "second" are used to distinguish between different objects, and not intended to describe a specific order. In addition, the term "include" and any other variant thereof are intended to cover non-exclusive protection. For example, a process, method, system, product, or device that includes a list of steps or units is not limited to the listed steps or units, but optionally includes steps or units not listed, or optionally includes other steps or units inherent to the process, method, product, or device. The term "a plurality of" in this application may mean at least two, for example, two, three, or more. However, the embodiments of this application are not limited thereto.

In addition, the term "and/or" in this specification describes only an association relationship for describing associated objects and represents that three relationships may exist. For example, A and/or B may represent the following three cases: Only A exists, both A and B exist, and only B exists. In addition, unless otherwise specified, the character "/" in this specification usually indicates an "or" relationship between associated objects.

The following further describes the implementations of this application in detail with reference to the accompanying drawings and embodiments. The detailed description of embodiments and the accompanying drawings are intended to illustrate the principle of this application, rather than to limit the scope of this application, meaning this application is not limited to the embodiments described herein.

In the description of this application, it should be understood that unless otherwise specified, the terms "first" and "second" are merely intended for a purpose of description, and should not be understood as any indication or implication of relative importance; the term "plurality of" indicates two or more (including two); orientations or position relationships indicated by the terms "inside", "outside", "top", "bottom", and the like are based on orientations or position relationships shown in the accompanying drawings, and are merely intended to simplify the description of this application for a purpose of easy description, rather than indicating or implying that an apparatus or a component must have a particular direction or must be constructed and operated in a particular orientation. Therefore, this shall not be construed as any limitation on this application.

An existing solution of high-gain antennas mainly relies on stacking of antenna radiating elements (or referred to as antenna radiating units or antenna elements), that is, a plurality of antenna radiating elements are connected and stacked through series or parallel feeding to achieve strong radiation. For the solution of stacking a plurality of antenna radiating elements, theoretically the gain can be increased as the number of antenna radiating elements is doubled; however, the feed network is more complex and link loss is greater, which may affect the antenna efficiency. This also increases the overall size and weight of the antenna, and features higher costs and more complex installation in engineering application, which is not conducive to integration with the communication device.

Figure 2:
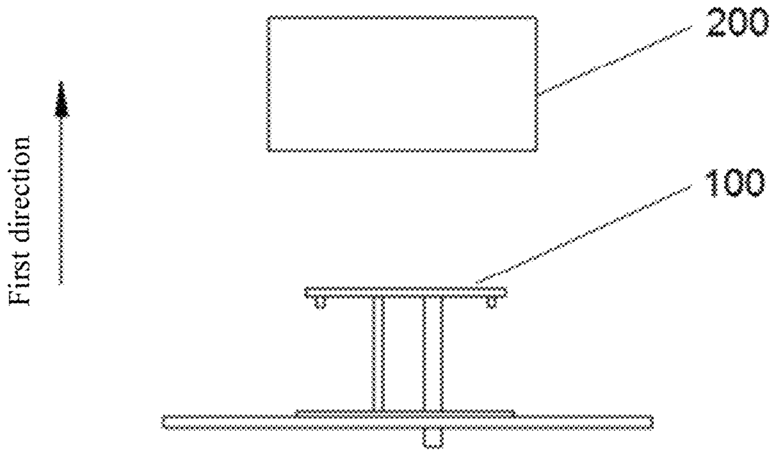
FIG. 2 is a schematic structural diagram of a front view of an antenna gain apparatus according to an embodiment of this application.

Referring to FIG. 1 and FIG. 2, FIG. 1 is a schematic diagram of a three-dimensional structure of an antenna gain apparatus according to an embodiment of this application; and FIG. 2 is a schematic structural diagram of a front view of an antenna gain apparatus according to an embodiment of this application. As shown in FIG. 1 and FIG. 2, the embodiments of this application provide an antenna gain apparatus, which may be spaced apart from an antenna radiating element 100. Specifically, the antenna gain apparatus may include a first guiding portion 200 and a second guiding portion 300.

In a specific implementation, the first guiding portion 200 may be spaced apart from the antenna radiating element 100. For example, the first guiding portion 200 may be disposed at one side of the antenna radiating element 100 in a first direction. During specific arrangement, the antenna radiating element 100 may be arranged horizontally, and the first direction may be a vertical direction. In this case, the first guiding portion 200 may be located above the antenna radiating element 100. In addition, the antenna radiating element 100 may alternatively be arranged in another direction, and a first direction also changes accordingly. The first direction may be perpendicular to a radiation plane of the antenna radiating element 100. The first guiding portion 200 may be made of a mono-dielectric material with a fixed dielectric constant. For example, the first guiding portion 200 may be made of polytetrafluoroethylene, which has lower loss, a relatively fixed dielectric constant, and higher stability and features easier processing and lower costs. The first guiding portion 200 may be a columnar structure, for example, may be in a shape of cylinder, cube, or the like. The first guiding portion 200 may be fastened on the antenna radiating element 100 through a support; or the first guiding portion 200 may be fastened, through a support or directly, onto an outer cover of an antenna, where the antenna is an antenna in which the antenna radiating element 100 is located.

In a specific implementation, the second guiding portion 300 may be fastened on the first guiding portion 200, and the second guiding portion 300 may be located at one side of the first guiding portion 200 in the first direction, for example, the second guiding portion 300 may be located at one side of the first guiding portion 200 away from the antenna radiating element 100 in the first direction. A shape of the second guiding portion 300 may match a shape of the antenna radiating element 100. In other words, the shape of the second guiding portion 300 may be the same as or similar to the shape of the antenna radiating element 100. The second guiding portion 300 may be in a sheet-like structure. The second guiding portion 300 may be of a metal material, such as a copper foil. The second guiding portion 300 may be embedded in the first guiding portion 200, so as to be fastened on the first guiding portion 200.

In practical application, the antenna radiating element 100 radiates electromagnetic waves to free space. The electromagnetic waves pass through the air and the first guiding portion 200 during propagation. Because dielectric constants of the first guiding portion 200 are different from dielectric constant of the air, the electromagnetic waves are refracted when passing through the first guiding portion 200, and phases of the electromagnetic waves may change. After electromagnetic waves of different phases are refracted, vectors with a same phase may be superimposed with each other, which can enhance the gain of the antenna radiating element 100 and also improve the radiation directivity of the antenna radiating element 100. Under the action of the field of the antenna radiating element 100, an induced current may be generated on the second guiding portion 300. The induced current may generate an electromagnetic wave with a same phase as the electromagnetic wave radiated by the antenna radiating element 100, which may be superimposed with the electromagnetic waves radiated by the antenna radiating element 100. This further enhances the gain of the antenna radiating element 100 and further improve the radiation directivity of the antenna radiating element 100.

During specific implementation, the phase and size of the induced current generated on the second guiding portion 300 are related to a distance between the second guiding portion 300 and the antenna radiating element 100. Therefore, the phase of the electromagnetic wave generated by the induced current may be adjusted by adjusting the distance between the second guiding portion 300 and the antenna radiating element 100, to be specific, by adjusting the distance between the first guiding portion 200 and the antenna radiating element 100, so that the electromagnetic wave generated by the induced current may be in-phase superimposed with the electromagnetic waves radiated by the antenna radiating element 100 to achieve the effect of enhancing the gain of the antenna radiating element 100.

The antenna gain apparatus provided in the embodiments of this application can enhance the gain of the antenna, improve the directivity, and increase the antenna coverage distance without changing the feed network of the antenna nor increasing the link loss or the size and weight of the antenna, featuring lower costs, simpler structure, easier installation, and convenient combination with antenna products for easy integration with the antenna products.

In a possible implementation, the distance between the first guiding portion 200 and the antenna radiating element 100 is L. Specifically, L may be a distance from a lower surface of the first guiding portion 200 to an upper surface of the antenna radiating element 100. For reference, $L=0.2\lambda$ to $0.4\lambda$. A is a wavelength corresponding to a center frequency of an operating frequency band of an antenna.

In specific implementation, a height of the first guiding portion 200 in the first direction is D1, and D1 may be considered as a thickness of the first guiding portion 200. For reference, $D1=0.23\lambda$ to $0.28\lambda$.

In a possible implementation, in the second direction, a cross-sectional size of the first guiding portion 200 may be greater than a size of the antenna radiating element 100. The second direction is perpendicular to the first direction. Such disposition enables the first guiding portion 200 to cover the antenna radiating element 100, ensuring that the electromagnetic waves radiated by the antenna radiating element 100 can pass through the first guiding portion 200 as much as possible, thereby maximizing the gain of the antenna radiating element 100.

In specific implementation, a height of the first guiding portion 200 in the second direction is D2. For reference, $D2=0.25\lambda$ to $0.3\lambda$. When the first guiding portion 200 is a cylinder, D2 is a diameter of the cylinder. When the first guiding portion 200 is a cube, D2 is a length of the cross-sectional diagonal line of the cube. For ease of description, D2 is referred to as a radial size of the first guiding portion 200. The distance L between the first guiding portion 200 and the antenna radiating element 100, the thickness D1 of the first guiding portion 200, and the radial size D2 of the first guiding portion 200 may be finely adjusted according to the shape of the antenna radiating element 100, so as to effectively enhance the gain of the antenna radiating element 100.

In a possible implementation, the first guiding portion 200 may have a through hole 101, and the through hole 101 may extend along the first direction. The disposition of the through hole 101 enables the first guiding portion 200 to have an air cavity, which may change the phase of the electromagnetic wave more, thereby producing more in-phase superimposition and further enhancing the gain and directivity of the antenna radiating element 100.

During specific implementation, the through hole 101 may be arranged to avoid the second guiding portion 300. Specifically, the through hole 101 may be arranged in a region not covered by the second guiding portion 300. In a possible implementation, the through hole 101 may be arranged corresponding to a central region of the antenna radiating element 100. The through holes 101 may be plural, and the plurality of through holes 101 are arranged in array.

Figure 3:
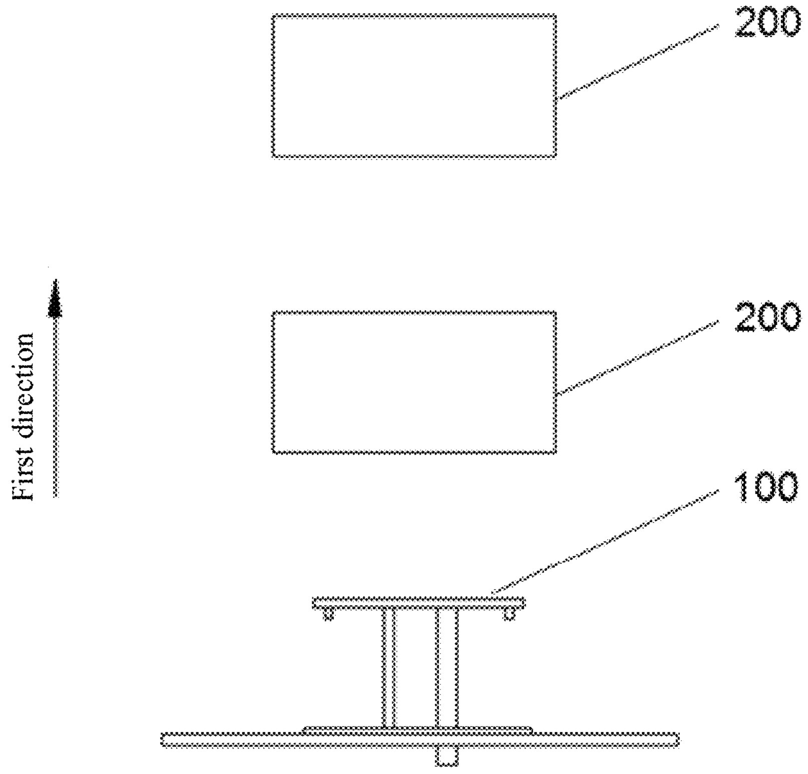
FIG. 3 is another schematic structural diagram of an antenna gain apparatus according to an embodiment of this application.

FIG. 3 is another schematic structural diagram of an antenna gain apparatus according to an embodiment of this application. As shown in FIG. 3, in a possible implementation, the first guiding portions 200 may be plural, and the plurality of first guiding portions 200 may be arranged sequentially away from the antenna radiating element 100 in the first direction. If space permits, a plurality of first guiding portions 200 may be arranged. Each first guiding portion 200 may enhance the antenna gain, and the plurality of first guiding portions 200 may work together to further enhance the antenna gain. In a specific implementation, a second guiding portion 300 may be disposed on each of the first guiding portions 200, respectively.

In specific implementation, a distance between each adjacent first guiding portions 200 may be equal to one another. The distance between adjacent first guiding portions 200 is L1, and a distance between a first guiding portion 200 closest to the antenna radiating element 100 and the antenna radiating element 100 is L, where L1=L. That is, the antenna radiating element 100 and the plurality of first guiding portions 200 may be arranged in sequence at an equal interval. This can ensure that the phases of the respective antenna gain apparatuses are in the same direction to more effectively enhance the antenna gain.

The following describes the gain effect of the antenna gain apparatus provided by the embodiments of this application with reference to the antenna pattern.

Figure 4:
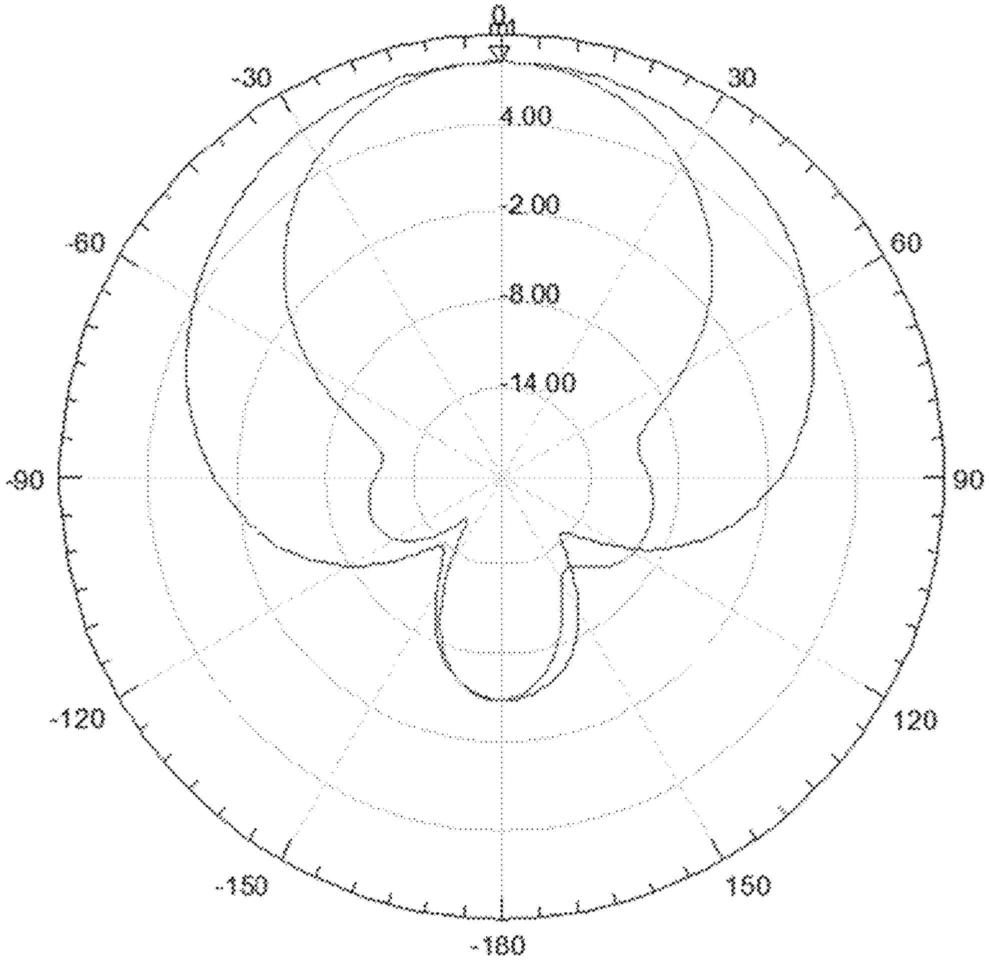
FIG. 4 is an antenna pattern of a 2.4G antenna radiating element without an antenna gain apparatus provided by the embodiments of this application.
Figure 5:
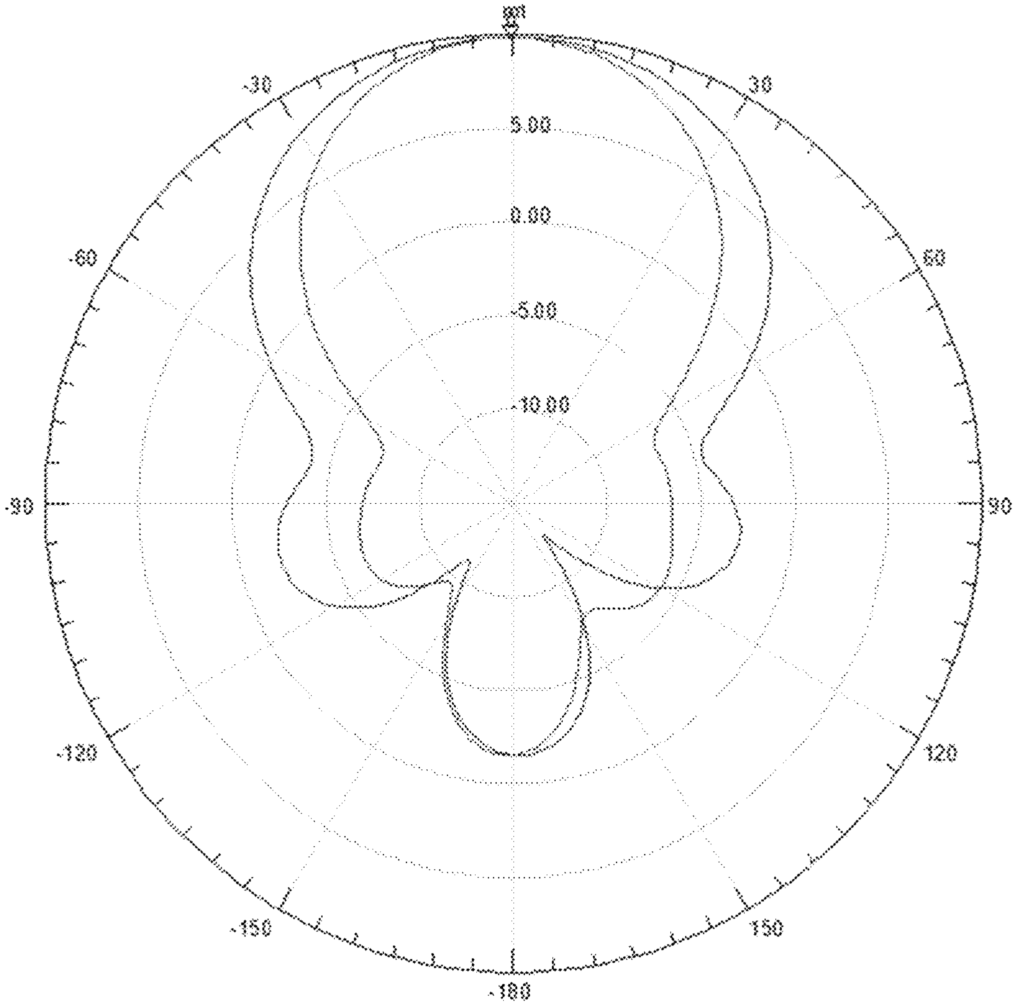
FIG. 5 is an antenna pattern of a same 2.4G antenna radiating element with one antenna gain apparatus provided by the embodiments of this application.
Figure 6:
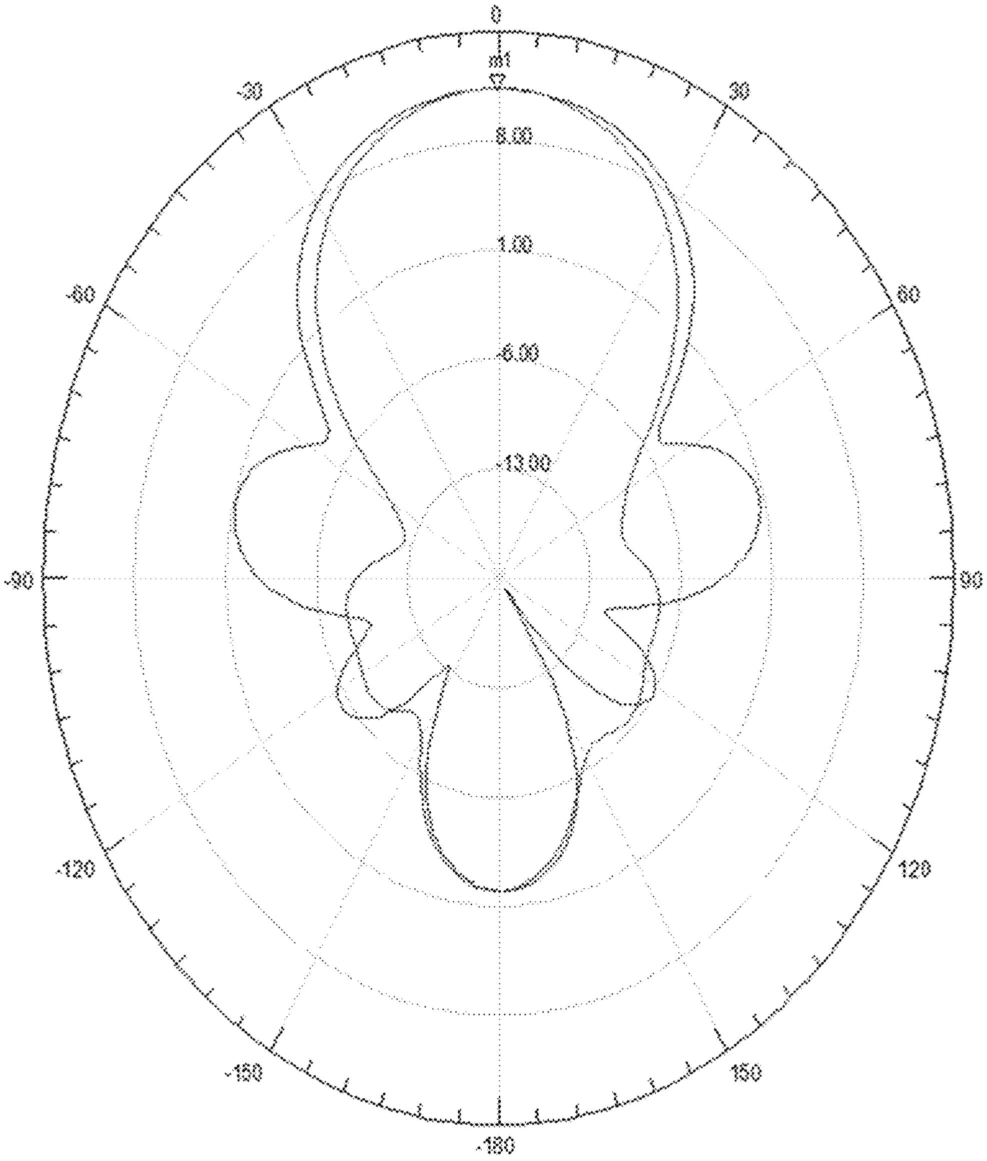
FIG. 6 is an antenna pattern of a same 2.4G antenna radiating element with two antenna gain apparatuses provided by the embodiments of this application.
Figure 7:
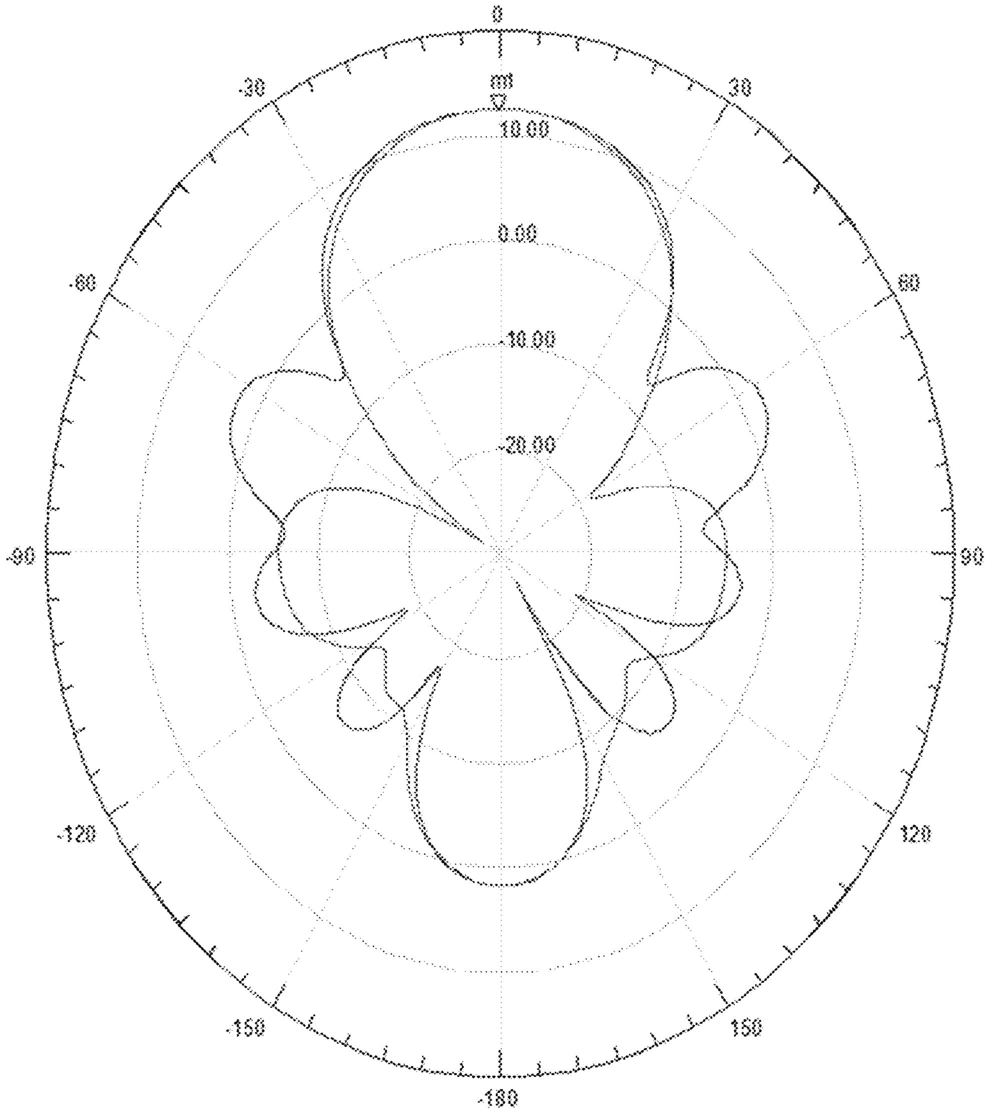
FIG. 7 is an antenna pattern of a same 2.4G antenna radiating element with three antenna gain apparatuses provided by the embodiments of this application.

FIG. 4 is an antenna pattern of a 2.4G antenna radiating element without an antenna gain apparatus provided by the embodiments of this application. FIG. 5 is an antenna pattern of a same 2.4G antenna radiating element with one antenna gain apparatus provided by the embodiments of this application. FIG. 6 is an antenna pattern of a same 2.4G antenna radiating element with two antenna gain apparatuses provided by the embodiments of this application. FIG. 7 is an antenna pattern of a same 2.4G antenna radiating element with three antenna gain apparatuses provided by the embodiments of this application. In FIG. 4 to FIG. 7, point ml represents a value of the antenna gain. As shown in FIG. 4, when an antenna gain apparatus is not disposed on the antenna radiating element, the gain is 8.1 dBi. As shown in FIG. 5, when one antenna gain apparatus is disposed on the antenna radiating element, the gain is 9.7 dBi, which is 1.6 dBi higher than when no antenna gain apparatus is provided. As shown in FIG. 6, when two antenna gain apparatuses are disposed on the antenna radiating element, the gain is 11.3 dBi, which is 3.2 dBi higher than when no antenna gain apparatus is provided. As shown in FIG. 7, when three antenna gain apparatuses are disposed on the antenna radiating element, the gain is 12.5 dBi, which is 4.4 dBi higher than when no antenna gain apparatus is provided.

Figure 8:
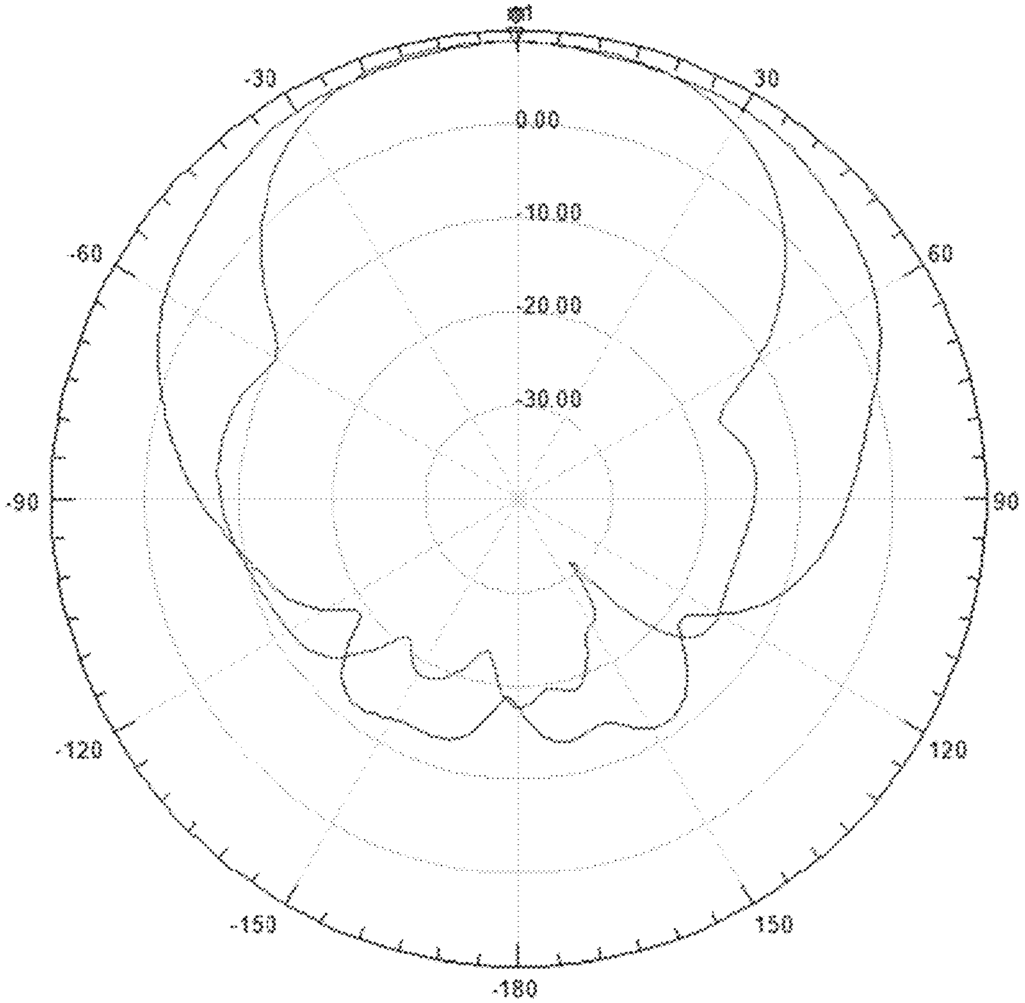
FIG. 8 is an antenna pattern of a 5G antenna radiating element without an antenna gain apparatus provided by the embodiments of this application.
Figure 9:
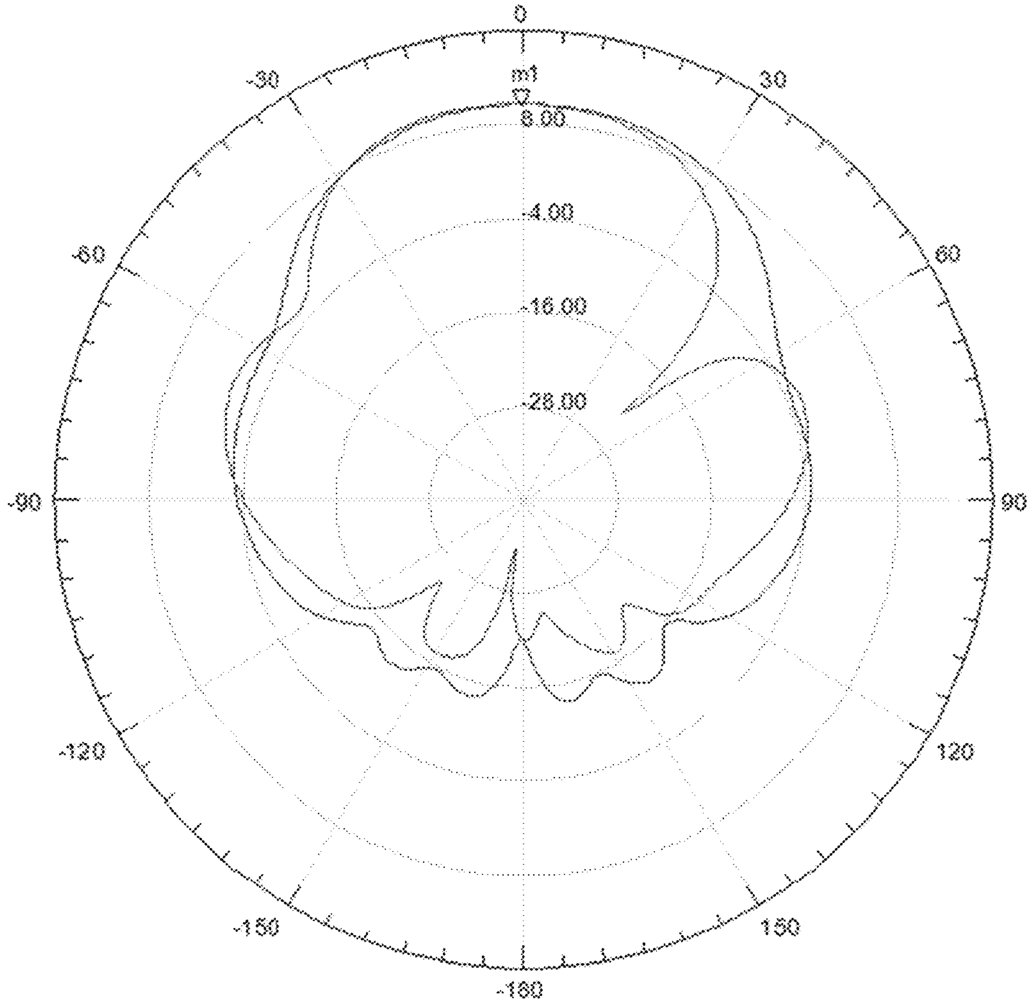
FIG. 9 is an antenna pattern of a same 5G antenna radiating element with one antenna gain apparatus provided by the embodiments of this application.
Figure 10:
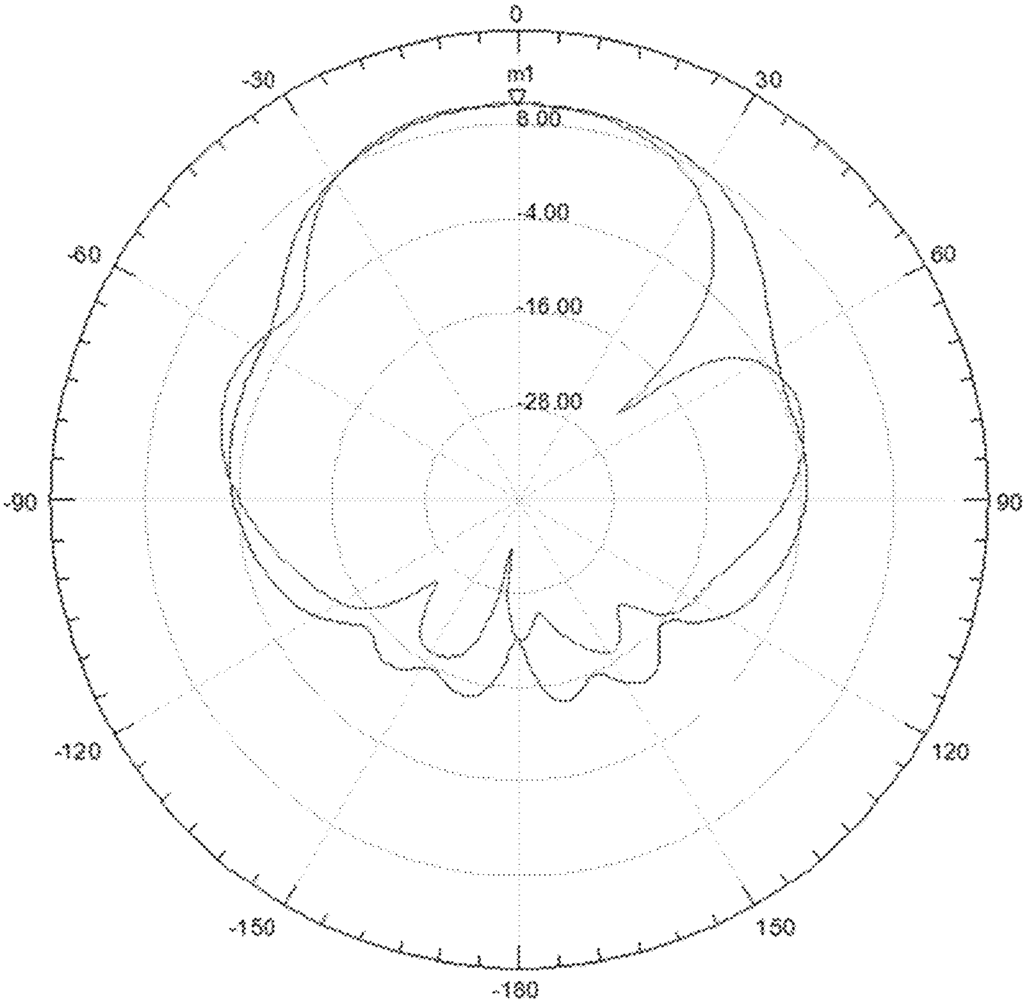
FIG. 10 is an antenna pattern of a same 5G antenna radiating element with two antenna gain apparatuses provided by the embodiments of this application.

FIG. 8 is an antenna pattern of a 5G antenna radiating element without an antenna gain apparatus provided by the embodiments of this application. FIG. 9 is an antenna pattern of a same 5G antenna radiating element with one antenna gain apparatus provided by the embodiments of this application. FIG. 10 is an antenna pattern of a same 5G antenna radiating element with two antenna gain apparatuses provided by the embodiments of this application. In FIG. 8 to FIG. 10, point ml represents a value of the antenna gain. As shown in FIG. 8, when an antenna gain apparatus is not disposed on the antenna radiating element, the gain is 8.7 dBi. As shown in FIG. 9, when one antenna gain apparatus is disposed on the antenna radiating element, the gain is 10.6 dBi, which is 1.9 dBi higher than when no antenna gain apparatus is provided. As shown in FIG. 10, when two antenna gain apparatuses are disposed on the antenna radiating element, the gain is 12.6 dBi, which is 3.9 dBi higher than when no antenna gain apparatus is provided.

An embodiment of this application further provides a communication device, including an antenna radiating element 100 and the antenna gain apparatus in the foregoing embodiments. The antenna gain apparatus may be disposed at one side of the antenna radiating element 100 in the first direction. In practical application, the communication device may be a wall-mounted or ceiling-mounted communication device suitable for directional antenna coverage scenarios, or may be a communication device suitable for other scenarios. The antenna gain apparatus may be used as a separate functional module, or may be combined with the form of the communication device and integrated inside the communication device. The communication device may include a plurality of antenna radiating elements 100. For each antenna radiating element 100, an antenna gain apparatus may be configured, so as to increase the gain of each antenna. In addition, when the antenna radiating element 100 is adapted to a parabolic antenna, the antenna gain apparatus may be applied to the feed design of the parabolic antenna to increase the gain of the antenna and improve the directivity.

This application is described with reference to the flowcharts and/or the block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

Alternatively, these computer program instructions may be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although optional embodiments of this application have been described, persons skilled in the art may make additional changes and modifications to these embodiments once they learn the basic inventive concept. Therefore, the appended claims shall be construed to cover the optional embodiments and all changes and modifications falling within the scope of the embodiments of this application.

Apparently, a person skilled in the art can make various changes and variations to the embodiments of this application without departing from the spirit and scope of the embodiments of this application. Therefore, the embodiments of this application are also intended to cover the changes and variations provided that the changes and variations of this application fall within the scope of the claims of this application or equivalent technologies thereof.

What is claimed is:

1. An antenna gain apparatus, wherein the apparatus comprises:

a first guiding portion, wherein the first guiding portion is disposed at one side of an antenna radiating element in a first direction and spaced apart from the antenna radiating element, and the first guiding portion is of dielectric material; and a second guiding portion, wherein the second guiding portion is disposed on the first guiding portion, the second guiding portion is located at one side of the first guiding portion in the first direction, and a shape of the second guiding portion matches a shape of the antenna radiating element.

2. The apparatus according to claim 1, wherein a distance between the first guiding portion and the antenna radiating element is L, and $L=0.2\lambda$ to $0.4\lambda$; wherein 2 is a wavelength corresponding to a center frequency of an operating frequency band of an antenna.

3. The apparatus according to claim 1, wherein a height of the first guiding portion in the first direction is D1, and $D1=0.23\lambda$ to $0.28\lambda$; wherein 2 is a wavelength corresponding to a center frequency of an operating frequency band of an antenna.

4. The apparatus according to claim 1, wherein a cross-sectional length of the first guiding portion in a second direction is greater than a length of the antenna radiating element in the second direction, and the second direction is perpendicular to the first direction.

5. The apparatus according to claim 1, wherein the first guiding portion has a through hole, and the through hole extends along the first direction.

6. The apparatus according to claim 5, wherein the through hole is arranged in an area of the first guiding portion that is not covered by the second guiding portion.

7. The apparatus according to claim 1, wherein the first guiding portion is plural, and the plurality of first guiding portions are sequentially arranged away from the antenna radiating element in the first direction.

8. The apparatus according to claim 7, wherein a second guiding portion is disposed on each of the first guiding portions, respectively.

9. The apparatus according to claim 7, wherein a distance between each adjacent first guiding portions is equal to one another.

10. The apparatus according to claim 9, wherein the distance between the adjacent first guiding portions is L1, and a distance between a first guiding portion closest to the antenna radiating element and the antenna radiating element is L, wherein $L1=L$.

11. The apparatus according to claim 1, wherein the first guiding portion is fastened on the antenna radiating element through a support; or the first guiding portion is fastened, through a support or directly, on a cover of the antenna in which the antenna radiating element is located, and the apparatus is fastened on the antenna.

12. The apparatus according to claim 1, wherein the first direction is perpendicular to a radiation plane of the antenna radiating element.

13. The apparatus according to claim 1, wherein the first guiding portion is a mono-dielectric material with a fixed dielectric constant.

14. The apparatus according to claim 1, wherein the second guiding portion is located at one side of the first guiding portion away from the antenna radiating element in the first direction.

15. The apparatus according to claim 14, wherein the second guiding portion is located on a surface of the first guiding portion at the one side of the first guiding portion.

16. The apparatus according to claim 1, wherein the second guiding portion is in a sheet-like structure.

17. The apparatus according to claim 1, wherein the second guiding portion is of a metal material.

18. The apparatus according to claim 1, wherein a radial size of the first guiding portion in the second direction is D2, and $D2=0.25\lambda$ to 0.32; wherein 2 is a wavelength corresponding to a center frequency of an operating frequency band of an antenna.

19. The apparatus according to claim 18, wherein when the first guiding portion is a cylinder, D2 is a diameter of the cylinder; and when the first guiding portion is a cube, D2 is a length of the cross-sectional diagonal line.

20. A communication device, comprising an additional antenna radiating element and the antenna gain apparatus according to claim 1, wherein the antenna gain apparatus is disposed at one side of the additional antenna radiating element in a first direction.

* * * * *